United States Patent [19]

Seki et al.

[11] Patent Number: 4,653,065
[45] Date of Patent: Mar. 24, 1987

[54] PREHEATING MECHANISM FOR USE WITH DUPLEX ELECTRIC-ARC FURNACE SYSTEM

[75] Inventors: Masahiko Seki; Hiroshi Nakatani; Katsuya Kogumasaka; Seiyu Takao; Isao Arimitsu; Hisanori Fujimori, all of Kitakyushu, Japan

[73] Assignee: Nippon Steel Corporation, Tokyo, Japan

[21] Appl. No.: 826,390

[22] Filed: Feb. 5, 1986

[30] Foreign Application Priority Data

Feb. 8, 1985 [JP] Japan .................................. 60-22827
May 24, 1985 [JP] Japan ............................ 60-77300[U]

[51] Int. Cl.⁴ ............................................. F27D 3/00
[52] U.S. Cl. ...................................... 373/80; 373/81; 373/78
[58] Field of Search ................. 373/78, 94, 80, 9, 60, 373/81; 432/65, 128, 163, 166, 170, 186; 266/142, 156

[56] References Cited

U.S. PATENT DOCUMENTS

| | | | |
|---|---|---|---|
| 1,102,382 | 7/1914 | Benjamin | 373/78 |
| 1,812,118 | 6/1931 | Ripberger | 373/81 |
| 3,379,815 | 4/1968 | Parker | 373/94 |
| 3,612,739 | 10/1971 | Korneff | 373/78 |
| 3,612,740 | 10/1971 | Gierek | 373/78 |
| 4,506,370 | 3/1985 | Yoshimatsu | 373/80 |
| 4,543,124 | 9/1985 | Vallomy | 373/60 |

FOREIGN PATENT DOCUMENTS 59-142698 9/1984 Japan .

Primary Examiner—Roy N. Envall, Jr.
Attorney, Agent, or Firm—Wenderoth, Lind & Ponack

[57] ABSTRACT

A preheating mechanism for use with a duplex electric-arc furnace system is disclosed. The mechanism comprises a car travelling in a direction parallel to the straight line connecting the centers of the two furnaces, and a traversing car that is positioned above said first car and travels in a direction transversal to the direction in which said first car travels, said traversing car being capable of travelling over said first car in said transversal direction until it reaches a position where it overhangs either one of the two furnaces, said traversing car being provided with a raw material preheating combustor and a dust collecting hood in such a manner that each of said combustor and hood can be raised or lowered in the vertical direction.

10 Claims, 14 Drawing Figures

PREHEATING MECHANISM FOR USE WITH DUPLEX ELECTRIC-ARC FURNACE SYSTEM

BACKGROUND OF THE INVENTION

1. Field of the Invention

The present invention relates to a preheating mechanism for use with a duplex electric-arc furnace system which performs alternate preheating and melting operations in two electric-arc furnace units for the purpose of improving the efficiency of melting in the overall system and for reducing the power consumption through preheating operations. The present invention also relates to a raw material-preheating apparatus that reduces the power consumption of melting operations by preheating with a fuel the metal scrap charged into the electric-arc furnace as a raw material.

2. Prior Art (1) A conventional duplex electric-arc furnace system which performs alternate preheating and melting operations in two electric-arc furnaces is shown in FIG. 9. The preheating furnace in this system is equipped with a cover that can be swung to avoid any interference with the movement of the electrodes. This design layout is disadvantageous in that a considerable amount of space is required to permit unimpeded movement of the furnace cover and that the swinging of said cover involves an undue long cycle time.

FIG. 9 shows the case where a set of electrodes 2 are placed in a furnace shell 1a for performing the melting operation and a preheater 3 is placed in the other furnace shell 1b for carrying out the preheating operation. In order to perform the preheating operation in the shell 1a and the melting operation in the shell 1b, the cover 4 is swung about a king pin 5 along the path indicated by the two-short-and-one-long dashed line A. The post 6 about which the preheater 3 is swung must be located at a position that clears the circular area defined by the line A having the radius r. With a furnace of twenty tons capacity, the value of r is typically about 8 m. If the post 6 is so positioned as to clear the circle having this value of radius, the preheater will require a very large area measuring a length (L) of 17 m and a width (W) of 16 m. In addition, the preheater 3 must be swung through an angle of about 270°, which requires a prolonged time to cover. Furthermore, in order to avoid heat radiation from the preheater 3 and the hazard of dropping materials, the operator must remain outside of the above specified area of the preheater as long as the operation of shifting the preheater from the shell 1b to the shell 1a is continuing.

(2) In order to reduce the power consumption of the melting operation in an electric-arc furnace, the scrap charged into the furnace is preheated by burning a fuel in a combustion chamber mounted on top of a vertical hole bored through the scrap (see, for example, Laid-Open Japanese Utility Model Publication No. 142698/1984). The present inventors previously filed Japanese Patent Application No. 132895/1984 (filed on June 29, 1984 and not yet laid open) for an improved version of this method, wherein the exhaust gas is recycled for the purpose of reducing the required amount of preheating fuel and minimizing the oxidative loss of the scrap. The success of this scrap preheating method depends on whether the following three requirements are met: (1) combustion of the fuel and gas is completed within the small space of the combustor; (2) the combustion gas of the fuel and gas is discharged at a pressure high enough to overcome the pressure loss that develops as the combustion gas permeates through the scrap layer; and (3) the gas-recycling system experiences a small pressure drop.

One problem associated with this preheating method is instability of the gas combustion resulting from direct mixing of the burning flame with the recycled exhaust gas of a low oxygen content. This leaves soot as the unburnt component, which is deposited on the scrap, hood, ducts and dampers. The soot deposit will deteriorate the environment of the shop unless some provisions are made such as, for example, periodical soot removal. In order to avoid direct mixing of the burning flame with the recycled exhaust gas, the latter must be supplied at high speed, but then, the exhaust gas recycling system will experience an increased pressure drop. If the head of the blower is increased so as to compensate for the pressure drop, the power saving accomplished by the preheating operation is partly cancelled by the increased power consumption of the blower.

SUMMARY OF THE INVENTION

One object, therefore, of the present invention is to provide a preheating mechanism for use with the duplex electric-arc furnace system that requires a smaller installation floor space and which is capable of completing the necessary switching operations in a very short time.

Another object of the present invention is to provide a raw material preheating apparatus that can be incorporated with the aforementioned preheating mechanism while effectively eliminating the defects of the conventional apparatus. The heating apparatus in accordance with the present invention ensures stable combustion during the preheating operation while achieving an even greater energy saving without experiencing any deleterious effects of soot formation or any pressure loss in the exhaust gas recycling system.

The first object of the present invention can be accomplished by a preheating mechanism for use with a duplex electric-arc furnace system that comprises a car travelling in a direction parallel to the straight line connecting the centers of the two furnaces, a traversing car that is positioned above said first car and travels in a direction transversal to the direction in which said first car travels, said traversing car being capable of travelling over said first car in said transversal direction until it reaches a position where it overhangs either one of the two furnaces, said traversing car being provided with a raw material preheating combustor and a dust collecting hood in such a manner that each of said combustor and hood can be raised or lowered in the vertical direction.

The second object of the present invention can be accomplished by a raw material preheating combustor that has a fuel combustion chamber in the center of the main combustion chamber, said fuel combustion chamber being surrounded by an annular passage through which the exhaust gas is recycled, and a chamber in which the burning gas is mixed with the recycled exhaust gas being provided ahead of the exist end of the fuel combustion chamber.

BRIEF DESCRIPTION OF THE DRAWINGS

FIGS. 1 and 2 show diagrammatically one embodiment of the preheating mechanism of the present invention for use with a duplex electric-arc furnace system, in which FIG. 1 is a plan view and a FIG. 2 is a partial fragmentary side elevational view;

FIG. 5(a) to (c) and FIG. 6(a) and (b) show another embodiment of the present invention, in which FIG. 5(a) is a plan view, FIG. 5(b) is a partial fragmentary front view, FIG. 5(c) is a side elevational view looking at the right hand side of FIG. 5(b) except that the pipes 42 and 43 show the state that the rasing of the combustor 15 is on the way, FIG. 6(a) is a plan view.

DETAILED DESCRIPTION OF THE INVENTION

The present invention is hereunder described in detail with reference to the accompanying drawings wherein like parts are identified by like numerals.

Figure 1:
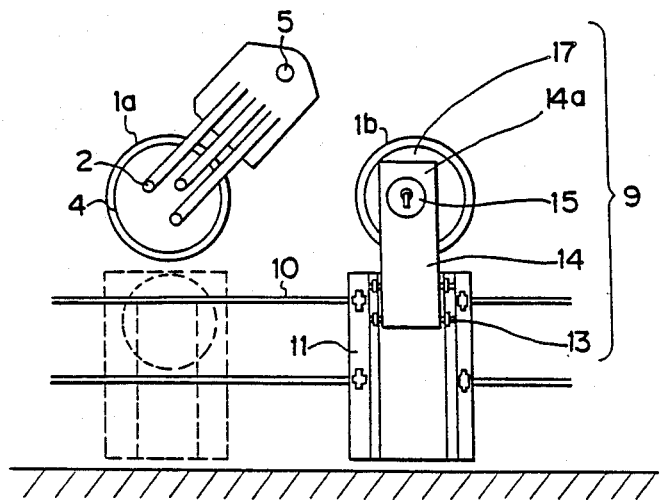
Figure 2:
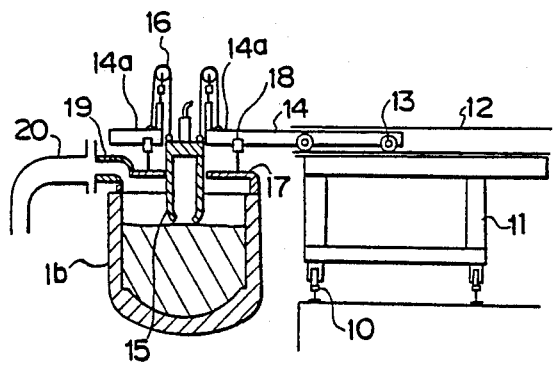

FIGS. 1 and 2 show one embodiment of the preheating mechanism of the present invention for use with a duplex electric-arc furnace system comprising two furnace shells 1a and 1b, with a set of electrodes 2 being placed in the shell 1a for performing the melting operation and a preheater 9 being set in the shell 1b for preheating purposes.

A rail track 10 is provided parallel to the straight line connecting the centers of the two furnace shells 1a and 1b. A car 11 is provided on the rail track 10 for travelling in a direction parallel to said straight line. The car 11 is provided on top with a traversing guide 12 composed of two pairs of upper and lower flanges and which has an I- or [-shaped cross section. A set of wheels 13 are so provided that they travel as being guided between the upper and lower flanges. A traversing car 14 is mounted on top of the car 11 and driven on the wheels 13. When the car 14 advances to the farthest end, its front portion 14a will overhang the shell 1b.

The front portion 14a of the car 14 is provided with a preheating combustor 15 that can be raised or lowered by means of hoists 16 composed of a cylinder, rod, pulley and chain. A preheating gas will be blown into the shell 1b through the combustor 15 in its lowered position. The front portion 14a of the car 14 is also provided with a dust collecting hood 17 that surrounds the combustor 15 and which can be raised or lowered by means of another hoists 18 composed of a cylinder and rod.

A duct 19 is provided at one end of the hood 17 and this duct, communicating with a pipe 20, serves as a dust collector.

If the operator who is carrying out the melting operation in the shell 1a while preheating the scrap in the shell 1b wants to carry out the melting operation in the shell 1b and the preheating operation in the shell 1a, he may follow the procedures indicated below:

(1) raising the preheating combustor 15 and the dust collecting hood 17 above the shell 1b;
(2) causing the traversing car 14 to travel over the car 11 to its retracted position;
(3) causing the car 11 to travel from the position where it faces the shell 1b to the position where it faces the shell 1a;
(4) raising the electrodes 2 and the cover 4 above the shell 1a (a detailed explanation of this step will be omitted);
(5) swinging the electrode 2 and the cover 4 to the position right above the shell 1b;
(6) lowering the electrodes 2 and the hood 4 so that they will be in their appropriate positions with respect to the shell 1b;
(7) advancing the traversing car 14 over the car 11 to the position where it overhangs the shell 1a; and
(8) lowering the combustor 15 and the hood 17 so that they will be in their right positions with respect to the shell 1a.

Assuming a 20-ton electric-arc furnace, these operations will require a floor space that measures approximately 12 m in length (L) and 12 m in width (W), a significant reduction compared with the conventionally required space ($17 \text{ m}^L \times 16 \text{ m}^W$).

As will be understood from the foregoing description, the preheating mechanism of the present invention will offer a significant economical advantage in that it can be installed in a comparatively small furnace building. In addition, the distances that have to be travelled by the cars 11 and 14 are so short that it takes a fairly short time to switch from the shell 1a to 1b and vice versa. This efficiency of switching operation will also contribute to a decreased heat loss because the top of the shell 1a or 1b is left open for only a limited time period. Furthermore, the dangerous zone out of which the operator should be kept is considerably reduced and a shop layout ensuring a high degree of safety for the operator can be realized.

Figure 3:
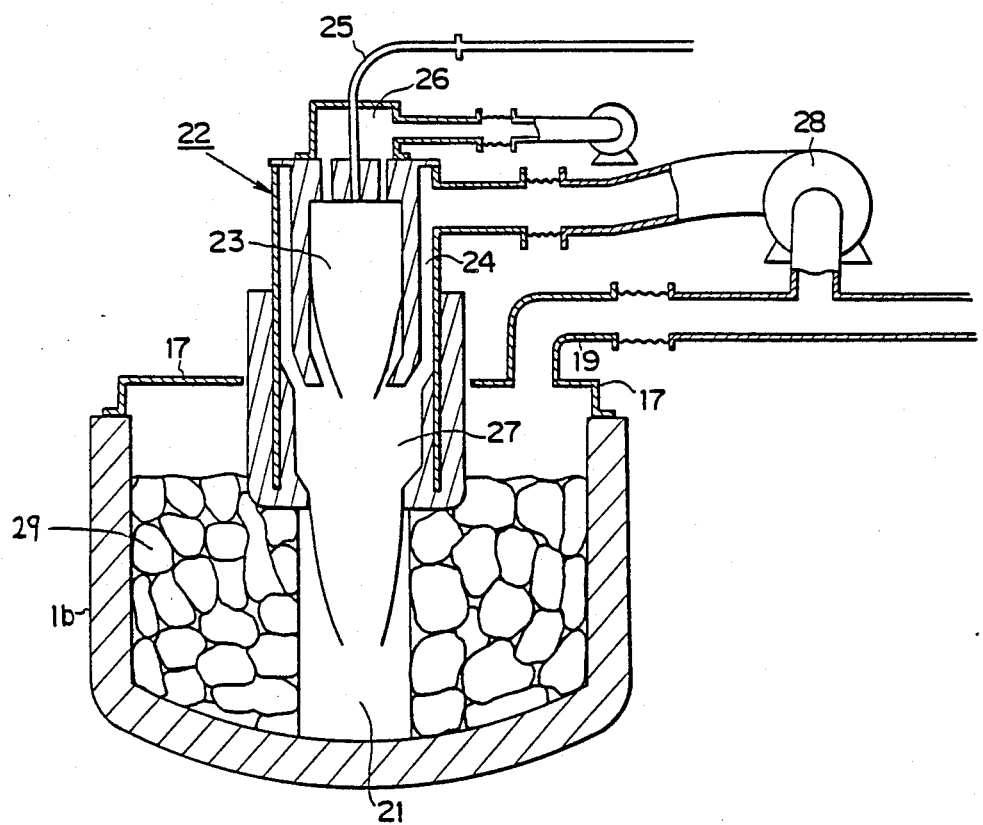
FIG. 3 is a side elevational section showing one embodiment of the preheating combustor used in the preheating mechanism of the present invention.

A modification of the preheating combustor 15 that is capable of more effective preheating of the raw material is shown in FIG. 3. In the embodiment shown in FIG. 3, the raw material 29 charged into the electric-arc furnace 1b has a center through-hole 21 and is preheated with a combustion chamber 22 mounted on top of the hole, and the resulting exhaust gas is recycled. A fuel combustion chamber 23 is provided in the center of the chamber 22 and surrounded by an annular exhaust gas recycling passage 24. The chamber 23 is supplied with a fuel such as kerosene, heavy oil, LPG or coke through a nozzle 25 and the fuel is burnt with the air fed through a channel 26. Stable fuel combustion will take place in the chamber 23 since the fuel is not mixed with the recycled exhaust gas until it enters a mixing chamber 27. This provides the additional advantage that no soot will form because of the absence of incomplete combustion.

The recycled exhaust gas is introduced into the mixing chamber 27 through the passage 24 and this obviates the need for making provisions such as using a blow nozzle for avoiding premature mixing between the recycled exhaust gas and the burning flame. As a result, a lower pressure suffices for the exhaust gas recycling system and the required head of a gas blower 28 (to be installed in the furnace building) can be reduced. The mixing chamber 27 is tapered toward the bottom so that the mixture of the burning fuel and the recycled exhaust gas will be blown into the center hole 21 at a high speed in the range of 30–100 m/sec.

In accordance with the preheating method described above, the wall of the fuel combustion chamber 23 is heated and must be cooled to maintain its strength. Since the temperature of the recycled exhaust gas is comparatively low (0°14 500° C.), the wall of the chamber 23 can be effectively cooled with an air stream instead of water which requires a more complicated cooling system than in the case of using air as a cooling medium. If desired, enhanced cooling may be realized by combining the air stream with water as a cooling medium.

As will be understood from the foregoing description, the preheating apparatus shown in FIG. 3 has the following advantages: (1) stable combustion is realized; (2) no soot which is deleterious to the preheating operation will form; (3) a low-capacity blower may be used for recycling the exhaust gas and this results in reduced power consumption; and (4) uniformity in the temperature of the burning gas will contribute to a higher degree of consistency in the preheating operation and a minimal oxidative loss of the scrap.

Figure 4B:
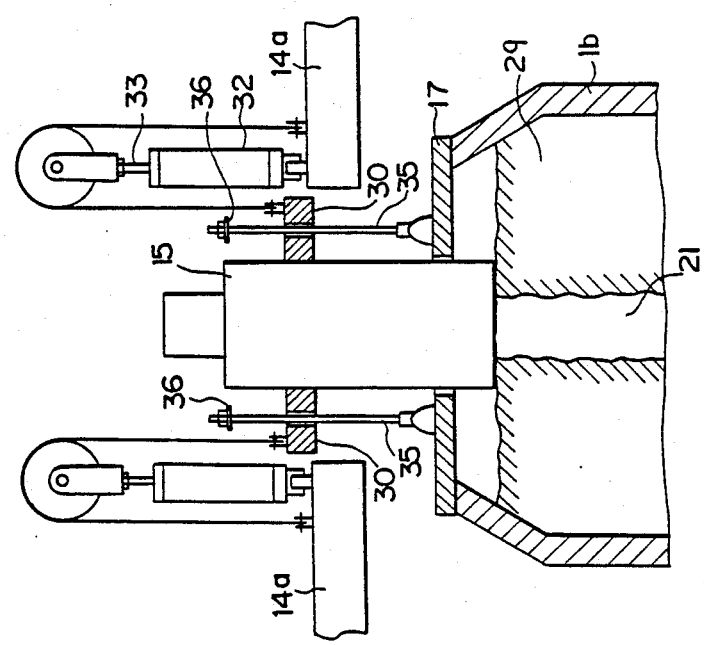
FIG. 4(a) and (b) in a partial fragmentary side elevational section one embodiment of the hoist that is capable of raising or lowering the preheating combustor independently of the dust collecting hood used in the preheating mechanism of the present invention.
Figure 4A:
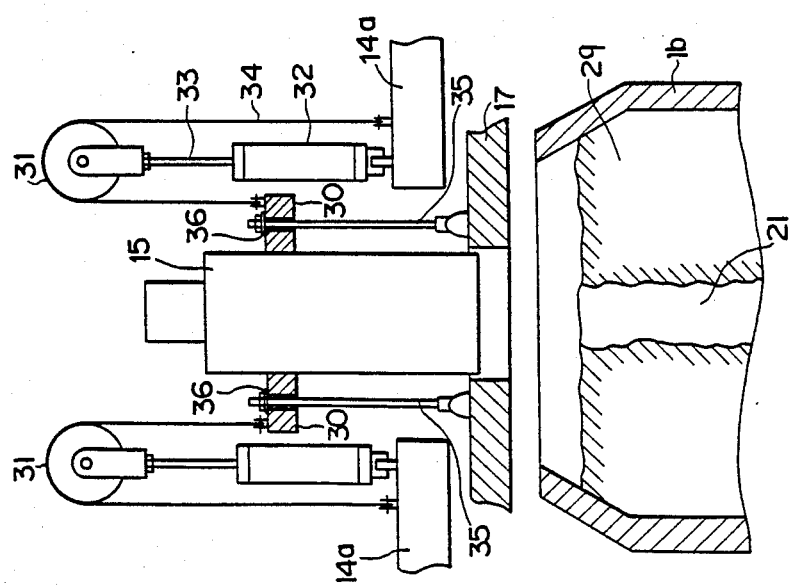

One embodiment of the hoist 16 for the preheating combustor 15 and the hoist 18 for the dust collecting hood 17 is shown in FIG. 4(a) and (b). FIG. 4(a) refers to the case where the combustor 15 and the hood 17 are raised above the electric-arc furnace 1b. The combustor 15 is raised or lowered by means of pulleys 31 that are operatively associated with supports 30 fixed to two diametrically opposite sides of the combustor 15. Supports 30 of more than two may be fixed to any sides of the combustor 15 or an annular support 30 may be fixed so as to surround the side of the combustor 15, as desired. Each of the pulleys 31 is connected to the front portion 14a of the traversing car 14 by means of a cylinder 32 and a rod 33. The numeral 34 denotes the belt or chain wound around each pulley. The dust collecting hood 17 is suspended on the supports 30 by means of rods 35. Each rod 35 is freely movable through a hole made in the corresponding support 30 and has an engaging device 36 at the top end.

FIG. 4(b) shows the case where both the combustor 15 and the hood 17 are lowered so that the combustor rests immediately above the center hole 21 through the charge in the furnace 1b, while the hood 17 is in contact with the throat of the furnace 1b.

Transition from the state shown in FIG. 4(a) to the state in FIG. 4(b) can be realized by the following procedures. First, the rods 33 on the cylinders 32 are lowered to cause the supports 30 to descend and, hence, to cause the preheater 15 and the hood 17 to descend. After the hood 17 comes to rest on top of the furnace 1b, the supports 30 continue to descend and the engaging devices 36 on the rods 35 are disengaged from the supports 30 so that the preheater 15 will continue to descend until it stops when it comes immediately above the center hole 21 through the charge 29.

These procedures may be reversed in order to realize transition from the state shown in FIG. 4(b) to the state in FIG. 4(a). The supports 30 are raised to cause the preheater 15 to ascend. After the supports 30 come into engagement with the devices 36 on the rods 35, said devices 36 and the rods 35 continue to ascend, whereby the dust collecting hood 17 is hoisted together with the preheater 15. When the hood 17 and the preheater 15 reach their respective positions indicated in FIG. 4(a), the operation of the cylinder 32 is terminated to stop the supports 30.

A partial modification of the mechanism shown in FIG. 2 is hereunder described with reference to FIG. 5(a) to (c) and FIG. 6(a) and (b).

Figure 5A:
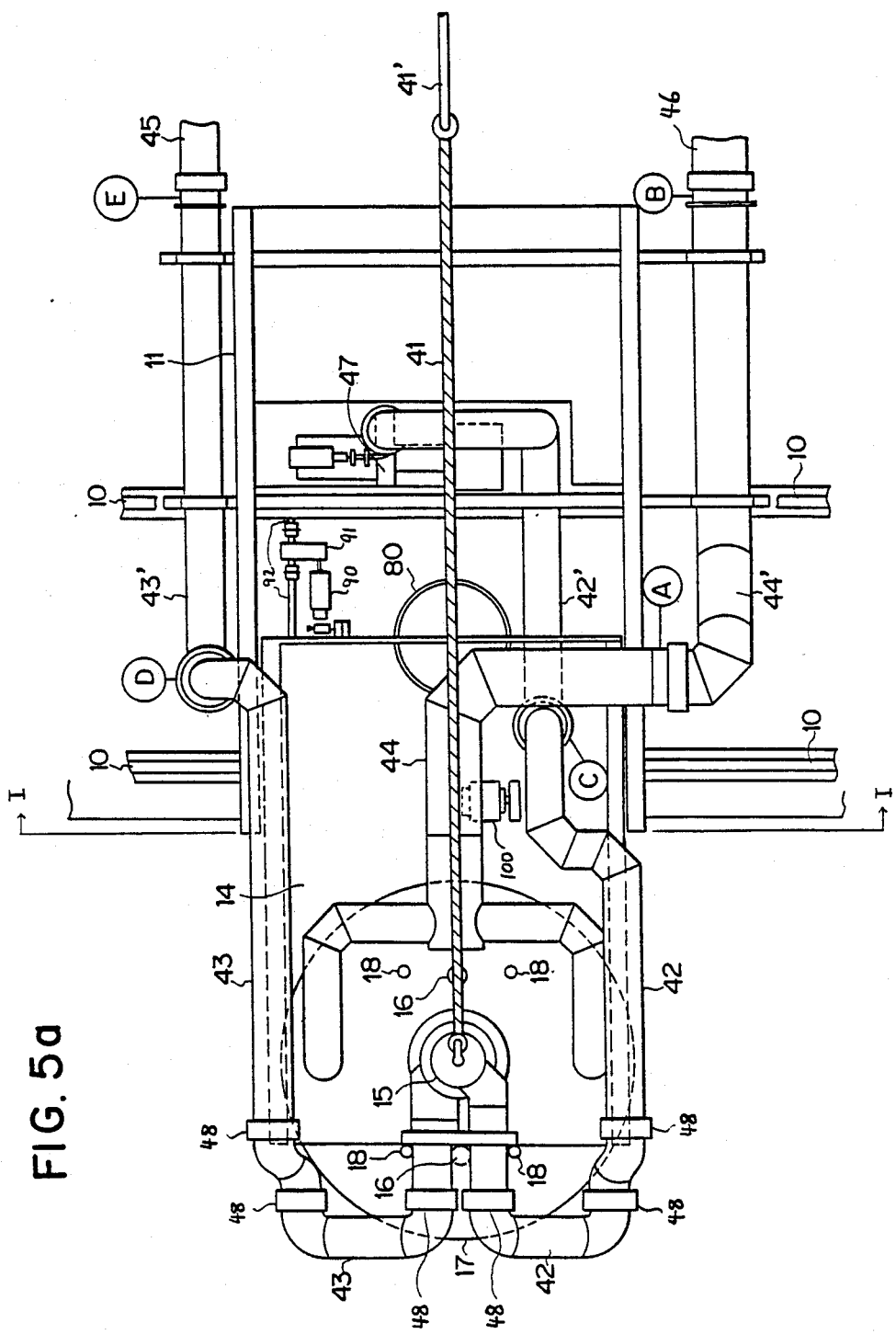
Figure 5B:
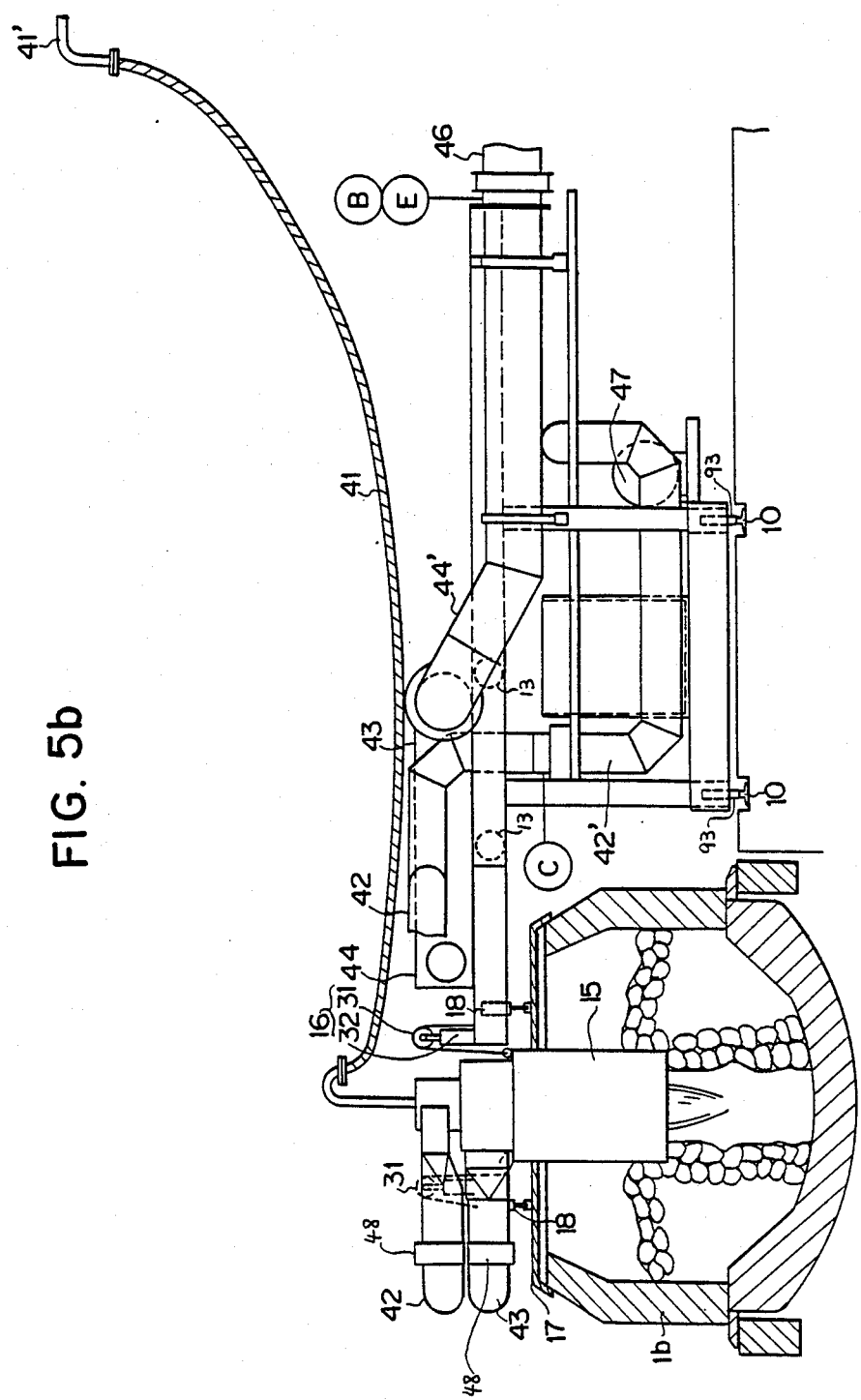
Figure 5C:
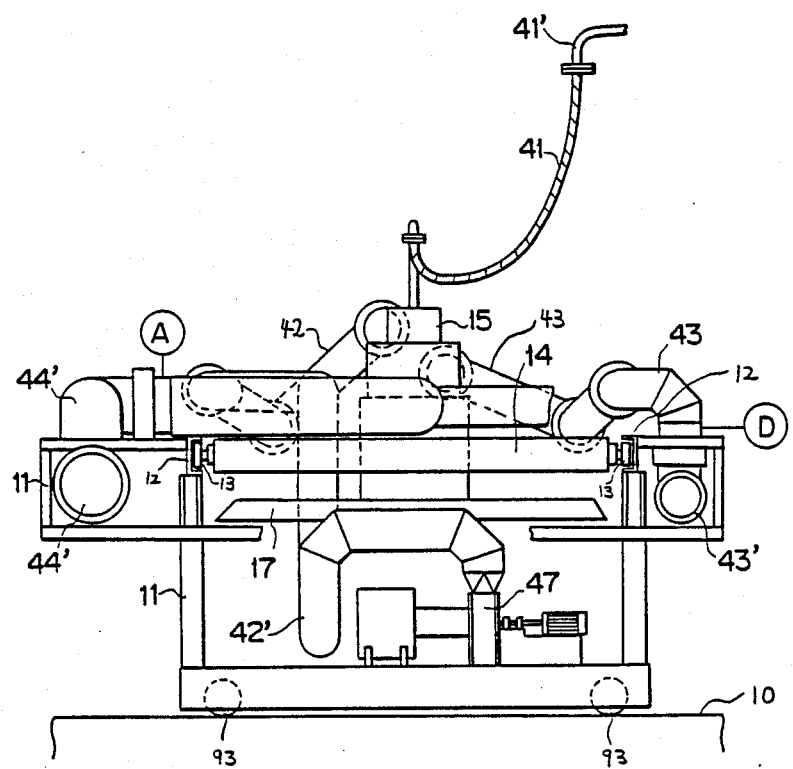

FIG. 5(a) to (c) show the case of preheating the scrap in the furnace 1b after the traversing car 14 travelling over the car 11, has proceeded to the position where it overhangs the furnace 1b, FIG. 5(a) is a plan view, (b) is a partial fragmentary front view, and (c) is a side view looking at the right hand side of (b) except that the pipes 42 and 43 show the state that the rasing of the combustor 15 is on the way.

The traversing car 14 used in the embodiment shown in these figures is equipped with a piping unit (I) composed of a combustion air pipe 42 that is connected at one end to the preheater 15, a recycled exhaust gas pipe 43 that is also connected at one end to the preheater 15, and an exhaust gas pipe 44 connected at one end to the dust collecting hood 17. The car 11 is equipped with a piping unit (II) composed of a combustion air pipe 42', a recycled exhaust gas pipe 43' and an exhaust gas pipe 44'. One end of the pipe 42 is detachably connected to one end of the pipe 42' by a break flange C; one end of the pipe 43 is detachably connected to one end of the pipe 43' by a break flange D; and one end of the pipe 44 is detachably connected to one end of the pipe 44' by a break flange A. The other end of the pipe 43' is detachably connected to one end of a fixed pipe 45 in the furnace building by a break flange E, and the other end of the pipe 44' is also detachably connected to another fixed pipe 46 in the building by a break flange B. The fuel is supplied to the preheater 15 through a pipe 41' (in the building) and a fuel hose 41. The car 11 is also provided with a combustion air fan 47 that is connected to the other end of the pipe 42'.

As shown in FIG. 5(a) to (c), the fuel may be supplied into the preheater 15 through the pipe 41' installed in the furnace building and through the fuel hose 41. The air for combustion is fed into the preheater 15 from the fan 47 on the car 11 through the pipes 42' and 42. The recycled exhaust gas is also supplied into the preheater 15 from the blower 28 (not shown but installed in the furnace building) through the pipes 43' and 43. The exhaust gas collecting under the hood 17 is discharged from the furnace building through the pipes 44 and 44'. In FIG. 5(a) and (b), the numeral 48 shows a swivel joint by which the pipes 42 and 43 can move up and down together with the combustor 15.

Figure 6A:
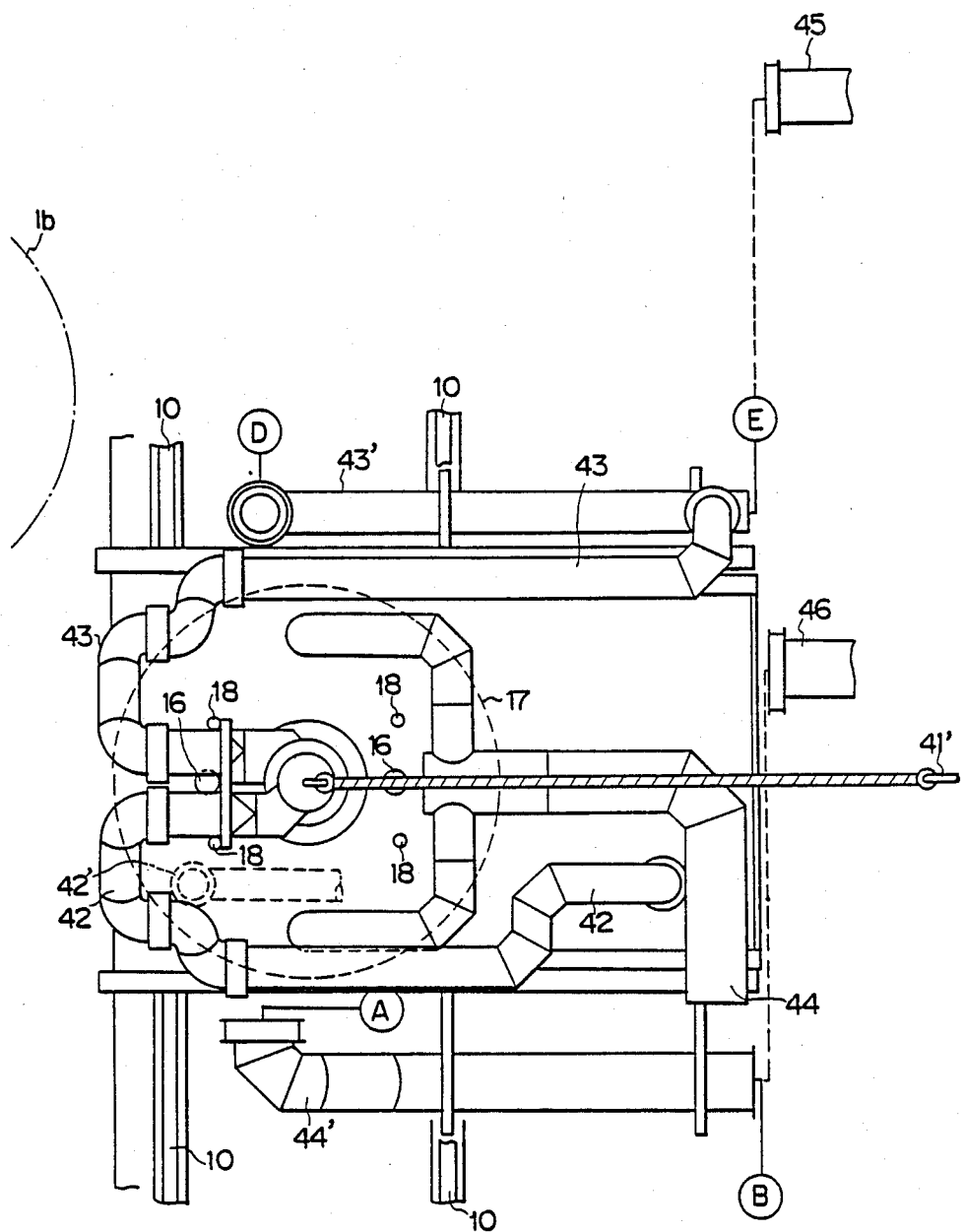

FIG. 6(a) and (b) show the state where the traversing car 14 has travelled over the car 11 to its retracted position; (a) is a plan view and (b) is a front view. As shown, all of the pipes that were connected by the break flanges (A) to (E) are in the disengaged state.

Figure 7A:
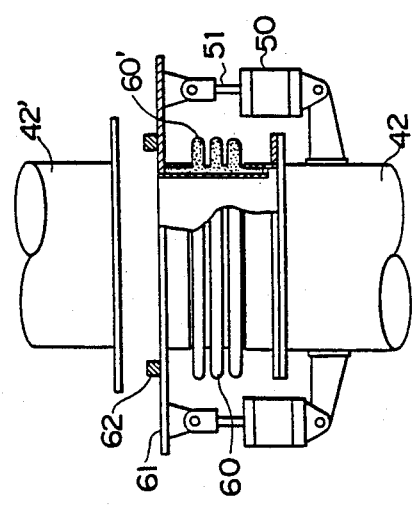
FIG. 7(a) and (b) show in a partial fragmentary enlarged view section (c) of FIG. 5(a) and (b) and FIG. 6(a) and (b)
Figure 7B:
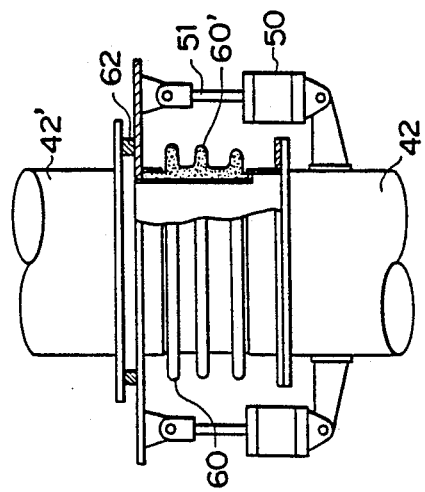

FIG. 7(a) and (b) show in a partial fragmentary enlarged view the break flange (C) indicated in FIG. 5(a) and (b), and correspond to the break flange (D) indicated in FIG. 5(a). If FIG. 7(a) and (b) lie respectively, such the horizontal states thereof correspond to the break flanges (A), (B) and (E). FIG. 7(a) refers to the state where the two combustion air pipes 42 and 42' are disengaged from each other. As shown, a compressible or bendable connector pipe 60 is compressed or bent by means of the force exerted by a cylinder 50. The profile of a cross section of the pipe 60 is denoted by 60'. Positioning member 62 disposed on a support frame 61 is detached from the pipe 42'. FIG. 7(b) shows the state where the pipes 42 and 42' are connected to each other. The connector pipe 60 is expanded by means of the rod 51 on the cylinder 50 and the positioning member 62 is in close contact with the pipe 42'. Again, the profile of a cross section of the pipe 60 is indicated by 60'. In order to disconnect the pipe 42 from 42', the rod 51 on the cylinder 50 is retracted as shown in FIG. 7(a).

Figure 6B:
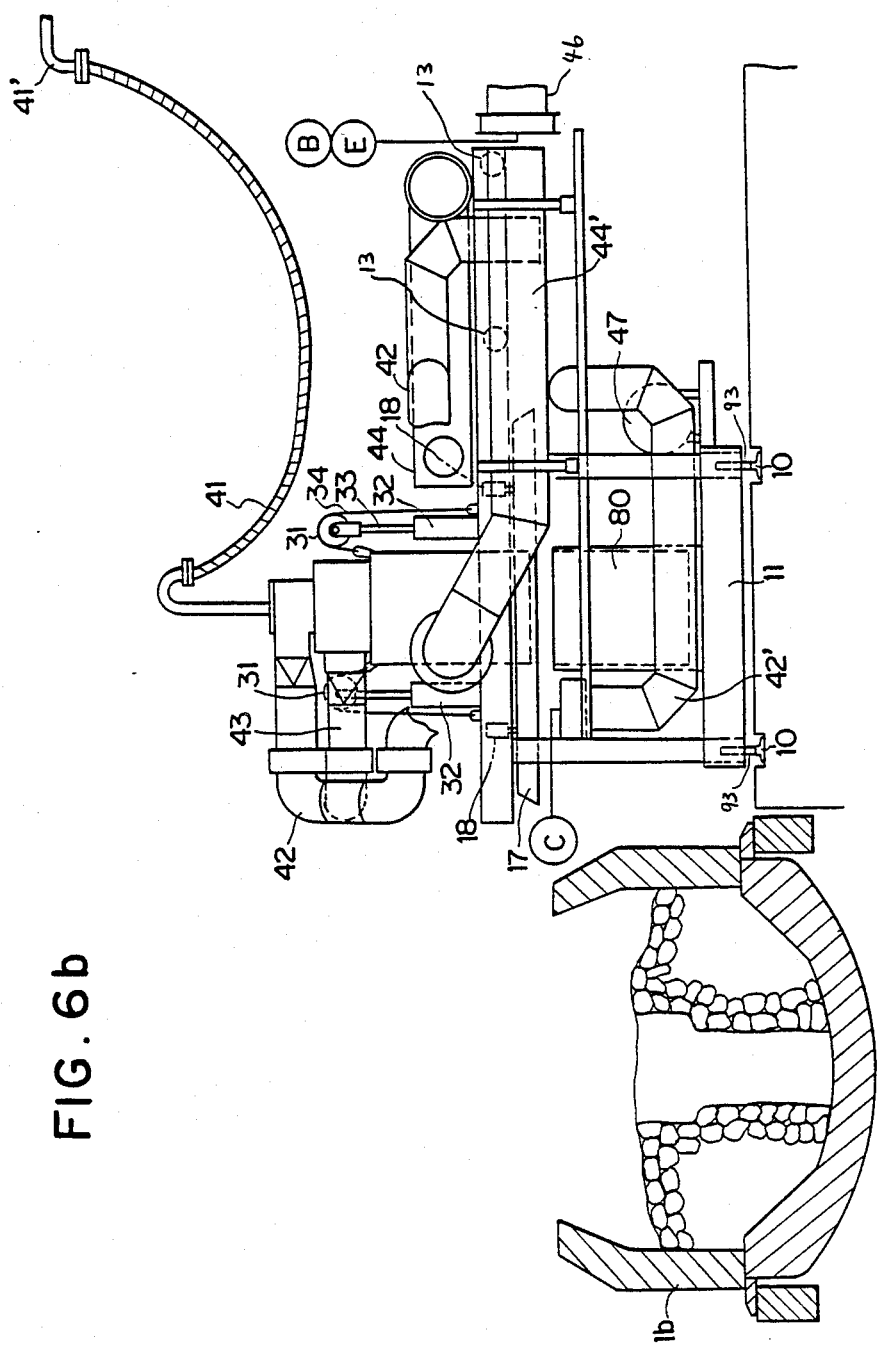
FIG. 6(b) is the front view of FIG. 6(a)

As is clear from FIG. 5(a) and FIG. 6(b), the car 11 may be equipped with a heat-resistant casing 80. This casing is so positioned that when the traversing car 14 has travelled over the car 11 to its retracted position, the casing will lie below the preheater 15, and then the preheater may be lowered by means of hoists 16 so that the casing receives the preheater and the nearby parts or components are protected from heat radiation. When the traversing car 14 travels over the car 11, the preheater is raised from the casing by means of hoists 16.

Figure 8:
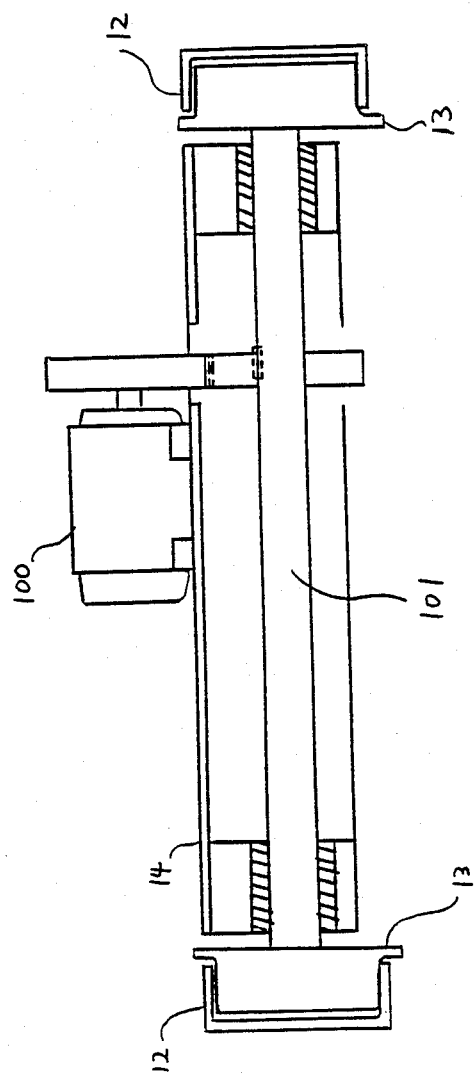
FIG. 8 is a abbreviated vertical section as seen in the direction indicated by the arrow I—I in FIG. 5(a).
Figure 9:
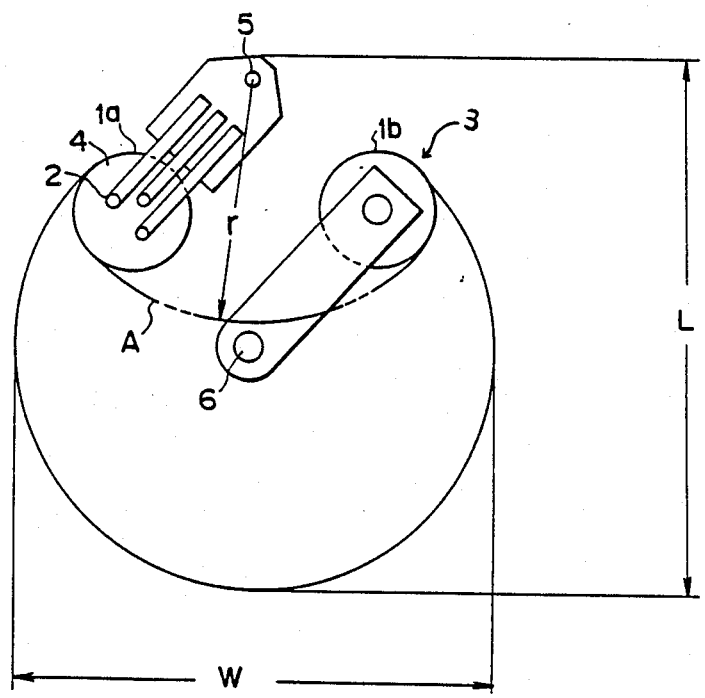
FIG. 9 is a sketch of a conventional duplex electric-arc furnace system.

Moreover, as shown in FIG. 5(a), the car 11 is equipped with a motor 90, a reduction gear 91 and a driving shaft 92, and wheels are rotated by the motor via the driving shaft whereby the car travels on the rail tracks 10. Furthermore, as shown in FIG. 5(a) and FIG. 8, the traversing car 14 has a motor 100 and a traversing and driving shaft 101, and wheels 13 are rotated by the motor 100 via the shaft 101 and they are guided by the traversing guides 12 whereby the traversing car travels over the car 11.

What is claimed is:

1. A preheating mechanism for use with a duplex electric-arc furnace system that comprises a car line connecting the centers of the two furnaces, a travelling in a direction parallel to the straight traversing car that is positioned above said car and travels in a direction transversal to the direction which said car travels, said traversing car being capable of travelling over said car in said transversal direction until it reaches a position where it overhangs either one of the two furnaces, said traversing car being provided with a raw material preheating combustor and a dust collecting hood in such a manner that each of said combustor and hood can be raised or lowered in the vertical direction.

2. A preheating mechanism according to Claim 1 wherein said raw material preheating combustor has a fuel combustion chamber in the center of the main combustion chamber, said fuel combustion chamber being surrounded by an annular passage through which exhaust gas is recycled, and a chamber in which the burning gas is mixed with the recycled exhaust gas being provided ahead of the exit end of the fuel combustion chamber.

3. A preheating mechanism according to claim 1 wherein said traversing car is equipped with a piping unit (I) composed of a combustion air pipe that is connected at one end to said raw material preheating combustor, a recycled exhaust gas piped that is also connected at one end to said raw material preheating combustor, and an exhaust gas pipe that is connected at one end to the dust collecting hood, said first car being equipped with a piping unit (II) composed of a combustion air pipe, a recycled exhaust gas pipe and an exhaust gas pipe, one end of each of the three pipes in the piping unit (II) being detachably connected to one end of the corresponding pipe in the piping unit (I) by a break flange, the other end of the recycled exhaust gas pipe in the piping unit (II) being detachably connected to one end of a fixed pipe in the furnace building, the other end of the exhaust gas pipe in the piping unit (II) being also detachably connected to one end of another fixed pipe in the furnace building.

4. A preheating mechanism according to claim 1 wherein said car is provided with a heat-resistant casing which, when said traversing car travels over said car to its retracted position, will lie below said raw material preheating combustor for subsequent receiving thereof.

5. A preheating mechanism according to claim 1 wherein said raw material preheating combustor and said dust collecting hood are provided in such a manner that they can be raised or lowered independently.

6. A peheating mechanism according to claim 5 wherein said raw material preheating combustor is equipped with a support fixed to each of two or more sides of said combustor and which has a through-hole, said dust collecting hood being equipped with a suspending rod that penetrates through the through-hole, said rod having an engaging device at top end and being fixed at bottom end to said hood, each of said supports being suspended on a means capable of vertical movement.

7. A preheating mechanism according to claim 6 wherein said support is fixed to each of two diametrically opposite sides of said combustor.

8. A preheating mechanism according to claim 6 wherein said raw material preheating combustor is equipped with an annular support which surrounds the side of said combustor and in which said through-holes of two or more are made.

9. A preheating mechanism according to claim 2 wherein a vertical hole is bored through the raw material charged into the electric-arc furnace for use in the preheating operation, the main combustion chamber being mounted on top of said hole for preheating the charged raw material, the exhaust gas resulting from the preheating operation being recycled to the main combustion chamber.

10. A preheating mechanism according to claim 3 wherein said first car is equipped with a combustion air fan that is connected to the other end of the combustion air pipe in the piping unit (II).

* * * * *